Nov. 14, 1933.  W. BURCKE  1,935,013
LAWN MOWER
Filed Nov. 30, 1931   2 Sheets-Sheet 1
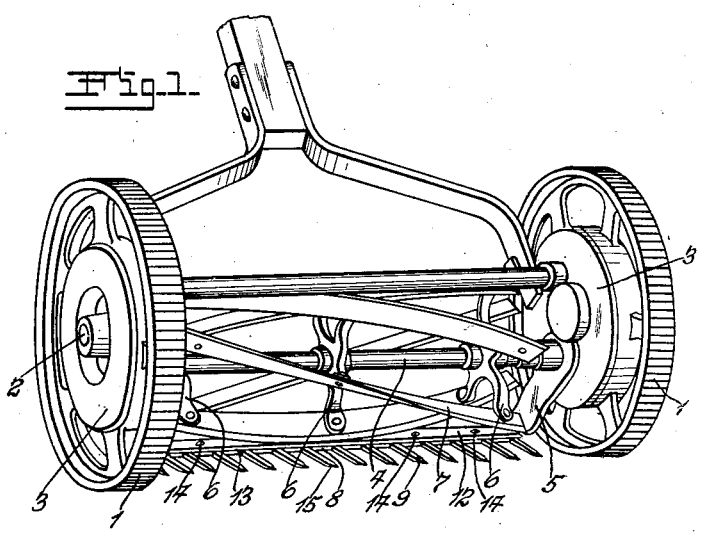
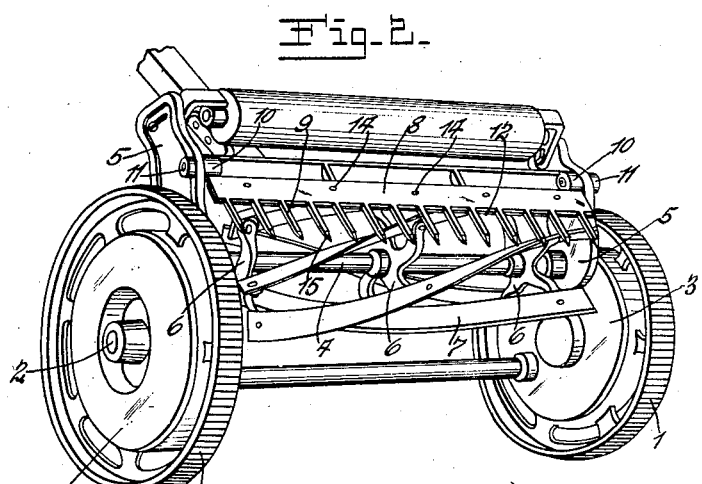
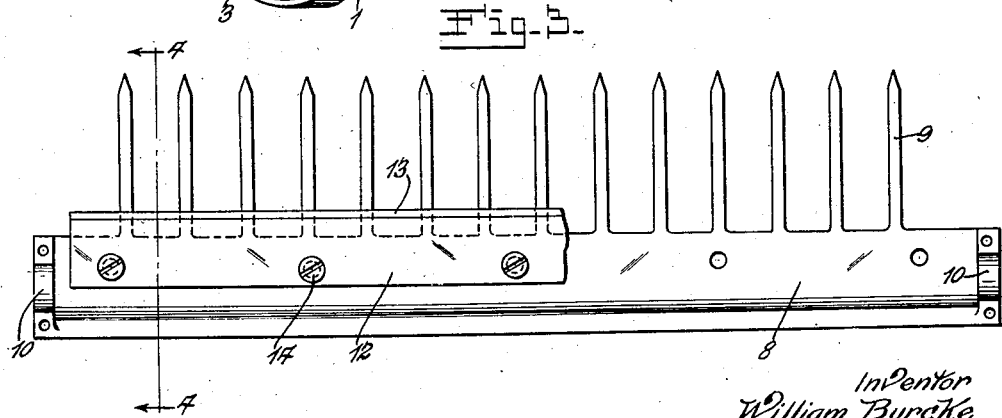
Inventor
William Burcke
by Rippey & Kingsland
His Attorneys Nov. 14, 1933.  W. BURCKE  1,935,013
LAWN MOWER
Filed Nov. 30, 1931  2 Sheets-Sheet 2
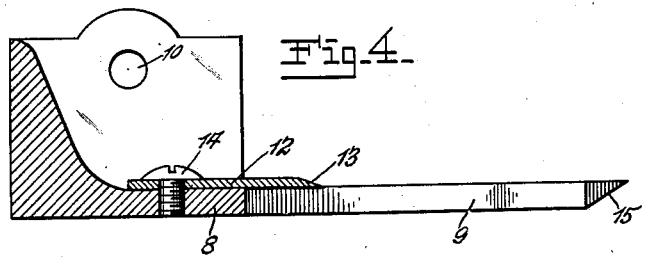
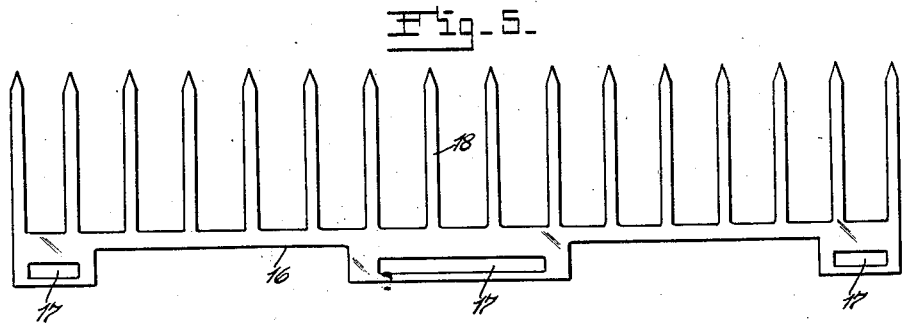
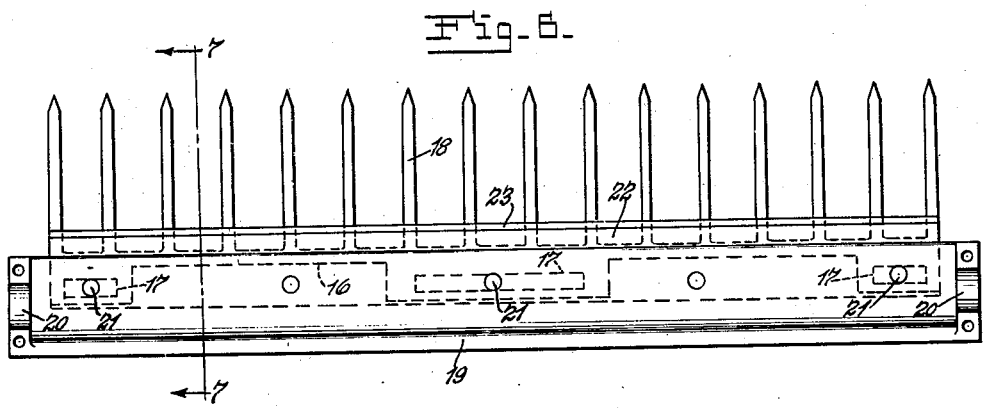
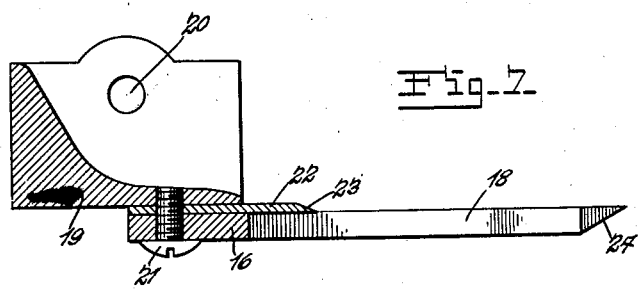

Patented Nov. 14, 1933

1,935,013

UNITED STATES PATENT OFFICE 1,935,013

LAWN MOWER

William Burcke, Robertson, Mo., assignor of one-half to John A. Nugen, Auburn, Ind.

Application November 30, 1931
Serial No. 578,004

2 Claims. (Cl. 56—249)

This invention relates to improvements in lawn mowers.

In order to keep lawns in good condition and to prevent blue grass, clover and other desirable grass and vegetation from being destroyed by water grass and other grass that creeps along and lies close against the surface of the ground, including dandelions and other obnoxious plants, it is necessary to remove or destroy these destructive and obnoxious grasses and plants. Destruction of these obnoxious grasses and plants may be effected in part by cutting them back close to their roots every time the lawn is mowed by the usual lawn mower. However, due to the fact that these destructive and obnoxious weeds and plants are frequently of a creeping nature and lie and adhere close to the surface of the soil, they are most frequently too low to be cut by the rotating reel knives of the usual lawn mowers. The result is that when the blue grass and other desirable grasses are cut by the lawn mowers, the destructive and obnoxious plants and weeds are merely cultivated and encouraged because they are not cut or damaged to any substantial extent by the lawn mower but are merely aided in their growth by the cutting of the blue grass and other desirable grasses.

My present invention comprises improvements in lawn mowers for raising the destructive and obnoxious plants and weeds, so that they will be cut off close to their roots by the usual rotating reel blades of the usual lawn mowers; and an object of the invention is to provide a device for embodiment and use in lawn mowers of familiar construction, whereby the usual operation of the lawn mower will raise the destructive and obnoxious plants and weeds and cause them to be cut off by the lawn mower during the operation of the lawn mower in cutting or mowing the blue grass and other desirable grasses growing on the lawn.

Another object of the invention is to provide a device for embodiment in lawn mowers as an accessory thereto, whereby the usual lawn mowers that are not equipped with this invention may readily be provided therewith.

Other objects of the invention will appear from the following description, reference being made to the accompanying drawings, in which—

Fig. 1 is a perspective view of a lawn mower in operative position and equipped with the present invention.

Fig. 2 is a perspective view of the lawn mower inverted.

Fig. 3 is an enlarged plan view of the device for lifting and raising the obnoxious grasses and weeds to position to be cut off by the lawn mower.

Fig. 4 is an enlarged sectional view on the line 4—4 of Fig. 3.

Fig. 5 is a plan view of the device constructed as an accessory for embodiment in any lawn mower after the lawn mower has been completed.

Fig. 6 is a plan view showing the accessory attached to the supporting bar to which the stationary cutter of the lawn mower is secured.

Fig. 7 is an enlarged cross sectional view on the line 7—7 of Fig. 6.

Lawn mowers of the type shown include supporting traction wheels 1 mounted on axle members 2 for rotating gearing (not shown) in housings 3, whereby the reel shaft 4 is rotated automatically and as an incident to the forward movement of the lawn mower and the consequent turning of the wheels 1.

Frames 5 are supported on the shaft 4 adjacent to the housings 3. Reel frames 6 are attached to the shaft 4 and spiral knives or cutters 7 are attached to said frames 6. Consequently, the spiral knives constitute a reel cutter, which is rotated at proper speed automatically and as an incident to the rolling of the wheels 1 along the ground.

My invention, as shown in Figs. 1 to 4, inclusive, comprises a strong bar 8 rigidly attached to the frames 5 and having a series of forwardly projecting teeth 9 in rigid or integral connection with the front edge thereof. The bar 8 has sockets 10 on its ends for receiving clamping fasteners 11, whereby the bar 1 is rigidly attached to and between the frames 5.

The rigid cutting bar 12 of the lawn mower is mounted upon the bar 8 in the manner shown, so that the beveled cutting edge 13 of said cutting bar extends across the upper sides of the teeth 9. A number of screw fastener devices 14 extend through appropriately formed holes in the cutting bar 12 and engage in threaded holes in the bar 8.

The forward ends of the teeth 9 are pointed in plan view (Fig. 3) and have their lower corners 15 beveled (Fig. 4), so that the beveled surfaces 15 will operate close to the ground and cause the points of the teeth 9 to raise the low lying obnoxious grasses and weeds and support the same across the cutting edge 13 of the bar 12. Consequently it is apparent that the rotating reel knives 7 will cut these obnoxious grasses and weeds as closely to their roots as said blades cut the desirable blue grass and other grasses. In this way, cultivation and encouragement of the destructive and obnoxious grasses and weeds are avoided and said grasses and weeds are destroyed.

In the embodiment described, the bar 8 displaces the usual support for the usual rigid cutting bar and is primarily intended to be embodied in the lawn mower when the lawn mower is originally built. In Figs. 5, 6 and 7, I have illustrated the invention embodied in a device that may be attached to almost any present lawn mower as an accessory. This form of the invention comprises a bar 16 having a number of longitudinal slots 17 adjacent to one edge thereof and a number of teeth 18 projecting from the opposite edge. A cutting bar support 19 is mounted rigidly in the lawn mower frame, the same having sockets 20 designed and adapted to receive the clamping fasteners 11, whereby said bar 19 will be rigidly supported. Screw fasteners 21 extend through the slots 17 and through holes in the cutting bar 22 and are screwed in threaded holes in the bar 19. Thus, these parts are secured together in a relationship in which the bar 19 is uppermost and in which the cutting bar 22 is between said bar 19 and the bar 16. The cutting edge 23 of the cutting bar 22 extends across the upper sides of the teeth 18 in the manner that the cutting edge 13 of the cutting bar 12 extends across the upper sides of the teeth 9. Thus, the cutting edge 23 against which the reel cutters 7 operate is in position to engage or be engaged by the raised grasses and weeds, which are presented thereto by the teeth 18 in position to be cut by the cutters 7. The forward ends of the teeth 18 are pointed in plan view (Figs. 5 and 6) and have their lower corners 24 beveled (Fig. 7), so that the beveled surfaces 24 will operate close to the ground and cause the points of the teeth 18 to raise the low lying obnoxious grasses and weeds and support the same across the cutting edge 23 of the bar 22. Consequently it is apparent that the rotating reel knives 7 will cut these obnoxious grasses and weeds as closely to their roots as said blades cut the desirable blue grass and other grasses. In this way, cultivation and encouragement of the destructive and obnoxious grasses and weeds are avoided and said grasses and weeds are destroyed.

It is apparent that this obvious form of the invention may be constructed in the lawn mower during the initial manufacture of the lawn mower as well as thereafter. Accordingly, the invention is capable of a wide variety of uses and applications and is of great service and benefit in maintaining lawns in proper condition and in exterminating obnoxious grasses and weeds.

The invention may be varied within the scope of equivalent limits without departure from the nature and principle thereof. I do not restrict myself in unessential particulars, but what I claim and desire to secure by Letters Patent is:

1. In a lawn mower having side frames and a reel of cutters rotatively supported between said frames; a bar rigidly mounted between said frames, teeth projecting forwardly from said bar, a cutting blade having its rear portion seated on said bar and its front portion extending across the upper sides of said teeth beyond the front edge of said bar and provided with a cutting edge for cooperation with said reel blades, and removable fasteners holding said cutting blade rigidly in said position.

2. In a lawn mower, the combination with a plurality of rotary cutter blades, of a cutter bar having a cutting edge in position to cooperate with said blades, a finger bar removably secured to and below said cutter bar and extending substantially throughout the length thereof, and a plurality of fingers joined with the forward edge of, and in the plane of said finger bar rearwardly of and below the cutting edge, said fingers protruding forwardly and below said cutting edge in parallel spaced relation to each other.

WILLIAM BURCKE.